United States Patent

[11] 3,631,419

| [72] | Inventor | Bin-Lun Ho<br>Los Gatos, Calif. |
|---|---|---|
| [21] | Appl. No. | 27,277 |
| [22] | Filed | Apr. 10, 1970 |
| [45] | Patented | Dec. 28, 1971 |
| [73] | Assignee | Iomec Incorporated<br>Santa Clara, Calif. |

[54] APPARATUS FOR THE VIBRATION-FREE POSITIONING OF MOVABLE COMPONENTS
13 Claims, 5 Drawing Figs.

[52] U.S. Cl. .................................................. 340/174.1 C,
340/174.1 F, 335/270
[51] Int. Cl. ..................................................... G11b 21/08,
H01f 7/16
[50] Field of Search .......................................... 340/174.1
C, 174.1 E, 174.1 F; 179/100.2 CA; 335/270

[56] References Cited
UNITED STATES PATENTS

| 3,119,987 | 1/1964 | Slavin | 340/174.1 C |
| 3,025,710 | 3/1962 | Muffley | 340/174.1 C |
| 3,009,759 | 11/1961 | Johnson et al. | 340/174.1 C |

Primary Examiner—Bernard Konick
Assistant Examiner—J. Russell Goudeau
Attorney—Townsend and Townsend ABSTRACT: Apparatus for positioning a carriage which is movable along a predetermined path by mounting a toothed rack parallel to the carriage movement, and engaging predetermined indentations of the rack with a plunger mounted to the carriage for movement in a direction perpendicular to the carriage movement. Means for moving the plunger into engagement with the rack is mounted to the apparatus base so that inertial forces upon acceleration and deceleration of the plunger are transmitted between the actuating means and the rack and the carriage is isolated from forces acting transversely to its direction of movement whereby lateral vibrations of the carriage due to inertial forces are eliminated.

Patented Dec. 28, 1971

INVENTOR.
BIN LUN HO

BY
Townsend and Townsend

ATTORNEYS

INVENTOR.
BIN LUN HO
BY
Townsend & Townsend
ATTORNEYS

APPARATUS FOR THE VIBRATION-FREE POSITIONING OF MOVABLE COMPONENTS

BACKGROUND OF THE INVENTION

The present invention relates generally to positioning devices for locating a movable member, such as a carriage, at a predetermined position without subjecting the member to lateral vibrations or oscillations from relatively high inertial forces acting on the carriage.

Although the vibration-free positioning device of the present invention is useful in various applications, it is particularly well adapted for the positioning of movable carriages for read-write heads of disk memories. Such carriages are movable in a radial direction towards and away from the center of data storage disks having large numbers of concentric data tracks. Typically, it is desired to retrieve information from a short sector of a data track after which the head is moved to another, not necessarily adjacent track for the pick up of additional data. For high speed operation it is necessary to move the carriage quickly over the radial width of the disks, to arrest its movement virtually instantly and to accurately position the read-write head over the desired data track.

If, during this high speed operation, the carriage is subjected to vibrations the output of the disk memory can be distorted, lost or wrong. Lateral vibrations of the carriage, and therewith of the read-write head, cause a change in the readback pattern and may cause problems in the read-write circuit. If the spacing of the signals is too close together the circuit might be unable to read them. Furthermore, lateral vibrations of the carriage also cause movement of the read-write head across the data tracks, i.e., towards and away from the center of the data disk, whereby the head can move off the desired data track so that no output is obtained, or, if the vibrations are of a sufficient amplitude the head can move across the next adjacent data track and read the wrong data. Either alternative is highly undesirable and must be avoided under all circumstances.

Prior art memory disk read-write head positioning devices provided conventional solenoids which were mounted to the memory disk frame or base adjacent the read-write head carriage and which, upon actuation, engaged gear racks or the like mounted to the carriage. High speed operation, and a correct indexing of the carriage require that the plunger or solenoid armature engages the indentations relatively forcefully which results in substantial inertial forces acting transversely to the direction of the carriage movement. These lateral forces result in significant lateral vibrations of the read-write head.

To prevent the aforementioned unacceptable side effects of vibrating read-write heads it was necessary to wait sufficiently long before actuating the read-write head so that the head vibrations cease or are reduced to a magnitude where they no longer affect the data pickoff. This waiting period causes a significant slow down in the speed with which disk memories can handle data and is, therefore, a serious shortcoming.

SUMMARY OF THE INVENTION

The present invention provides apparatus for positioning movable carriages, such as the read-write head carriage of a disk memory, in which inertial forces developed by movable components which mechanically index the carriage are isolated from the carriage so that the carriage is not subjected to lateral vibrations. Briefly, the present invention provides an indexing member axially movable in a direction perpendicular to the direction of carriage movement, means for axially movably mounting the member to the carriage and an indexing rack extending parallel to the carriage movement and mounted to a supporting structure of the apparatus for engagement by the member. Means are further provided for selectively moving the member into engagement with a predetermined portion of the rack to thereby precisely locate the carriage in a predetermined position.

In the presently preferred form of the invention a pair of plunger means are mounted to the carriage side by side. While the spacing of the indentations in the rack is twice the conventional spacing between adjacent data tracks on data disks, to assure an accurate positioning and prevent a premature wear of the positioning components, the spacing between the adjacent plungers equals a multiple of the spacing between adjacent detents plus one-half such spacing. The read-write head can thereby be positioned over any desired data track by engaging an indentation with one or the other of the plungers.

The plunger actuating means comprises a solenoid in which the plunger defines the solenoid armature. The solenoid is so constructed that the plunger can move with the carriage while energization of the solenoid engages the plunger with an indentation in the rack irrespective of the relative position of the plunger in the solenoid.

To prevent inaccuracies in the positioning of the read-write head from play in the mounting of the plunger on the carriage and resulting backlash, the mounting means for the plunger preferably comprise a plurality of spaced apart leaf springs which are rigid in the direction of the carriage movement and flexible in the direction of movement of the plunger towards and away from the rack.

In contrast to prior art carriage positioning devices, in which actuation of the positioning plunger caused lateral reaction forces and corresponding lateral vibrations in the carriage, the direct transmission of the inertial forces, as well as of the magnetic forces exerted by the plunger actuating solenoid, to the toothed rack and its supporting structure carried by the machine base virtually completely isolates the carriage from lateral forces. The heretofore common shortcomings of memory disk read-write head positioning devices, and particularly the need for a slow down in the data handling speed to provide sufficient time for the head vibrations to cease, is thereby eliminated. Substantially higher rates of data handling can thus be obtained with apparatus that is as economical to produce as prior art positioning devices.

DESCRIPTION OF THE PREFERRED EMBODIMENTS

Figure 1:
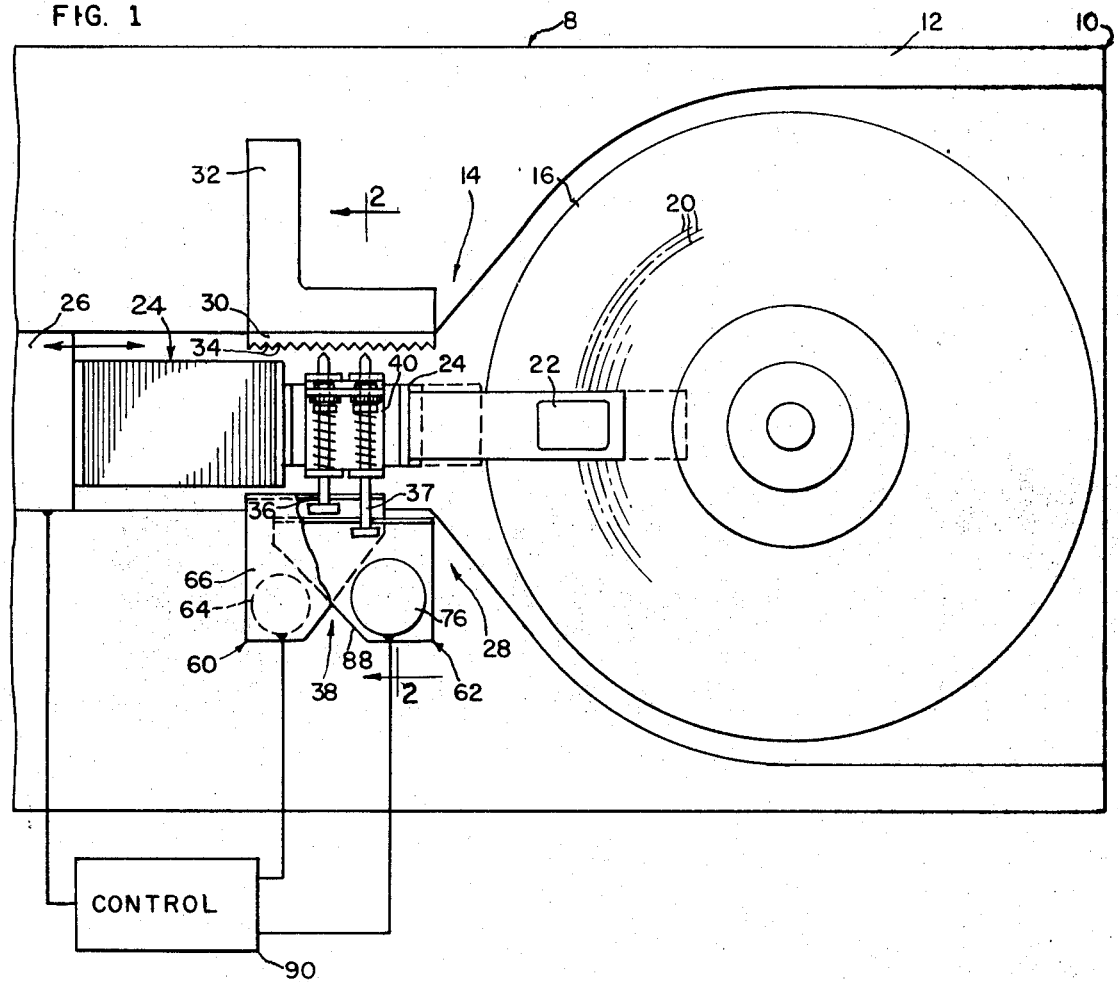
FIG. 1 is a fragmentary plan view of a portion of a disk memory, including its data disk, its read-write head and the carriage therefore, and a read-write head positioning device constructed in accordance with the present invention, and it shows, in phantom lines, the position of various components of the device and the read-write head when the latter is moved to the radially outer region of the data disk.

Referring to FIG. 1, those parts of a conventional disk memory 8 which are pertinent to the present invention are first described. The disk memory is defined by a support structure 10 which houses the electronics of the memory and defines or supports a base 12 for the information recording and retrieval components 14 of the apparatus. A turntable (not separately shown) rotates a magnetic data disk 16 about a center 18 of the turntable. The data disk includes conventional concentric circular data tracks 20 which are radially spaced 0.010 inch.

Data bits are recorded on the disk and picked off by a conventional read-write head 22 which can extend across a substantial portion of the radial width of the disk. The head is conventionally secured to a carriage 24 which is movable on base 12 for transporting the read-write head 22 across the disk width.

During a typical operation of the disk memory data bits randomly distributed over all data tracks 20 of disk 16 are recorded or picked off in accordance with instructions received from a computer (not shown). This requires that the read-write head is constantly moved radially inward and outward of center 18 to position it at the data tracks from which data bits are to be read or recorded. The desired rapid operation of the disk memory requires movement of carriage 24 by a drive mechanism 26 which is actuated and controlled by signals emanating from a computer. Upon receiving a signal to position the read-write head at a given track the drive mechanism moves the head until the head is substantially, e.g., within a few thousandths of an inch of a true alignment with the track. Exact alignment of the track and the head, however, requires the provision of a positioning device 28 which moves the head the last few thousandths of an inch and then positively and immovably maintains the head in that position until a further signal commands the repositioning of the head to read or write on another data track.

Figure 2:
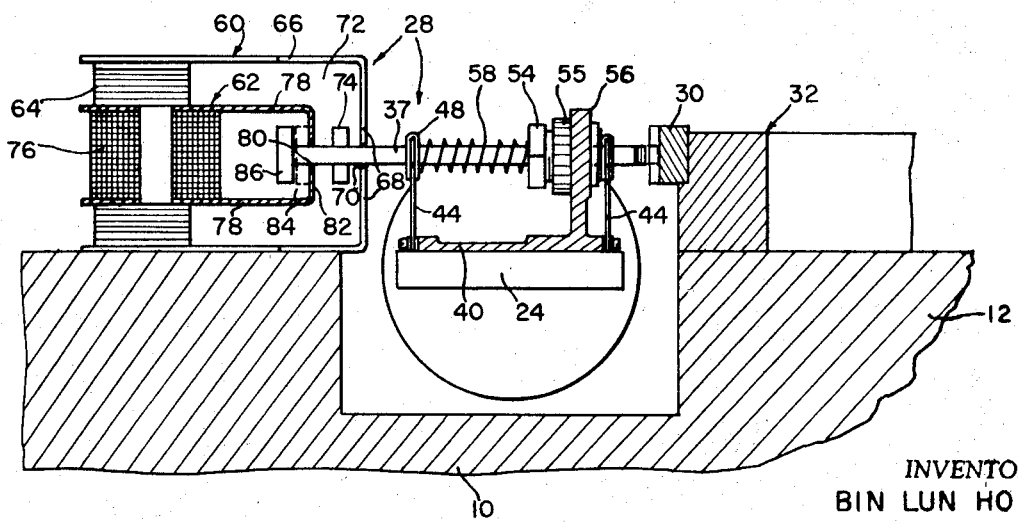
FIG. 2 is a fragmentary, side elevational view and is taken on line 2—2 of FIG. 1.
Figure 3:
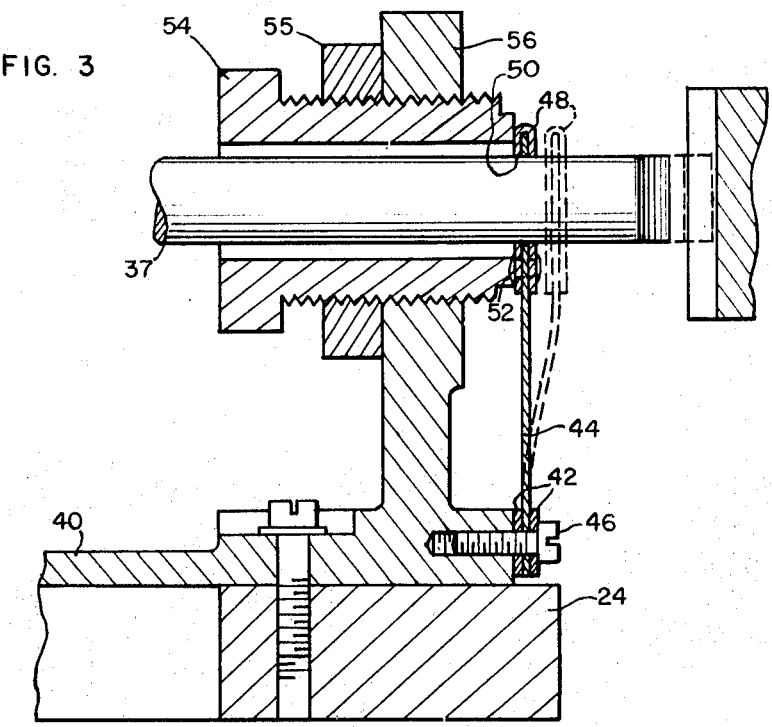
FIG. 3 is a fragmentary, enlarged cross-sectional elevational detail of the mounting means for the positioning plunger.

Referring now to FIGS. 1, 2, and 3, the positioning device of the present invention generally comprises an elongate positioning rack 30 secured to a support wall 32 projecting upwardly from base 12. The rack extends parallel to the direction of movement of carriage 24 and the side of the rack facing the carriage includes a plurality of side-by-side, equally spaced and preferably tooth-shaped indentations 34. To enable a positioning of head 22 over each rack and to enable the construction of indentations with sufficient strength to assure the accurate indexing of the indentations and prevent a premature wear of the rack the spacing between adjacent indentations is preferably twice the 0.010 data track spacing, or 0.020 inch.

The positioning device of the present invention further includes a pair of parallel, spaced apart axially movable plungers 36, 37 which are mounted to carriage 24 for axial movement of the plungers in a direction perpendicular to the direction of movement of the carriage towards and away from positioning rack 30. Plunger actuating means 38, more fully described hereinafter, are fixedly mounted to base 12 and, upon receiving a command signal move one or the other of the plungers into engagement with a predetermined indentation in the positioning rack to precisely locate read-write head 22 over the desired data track 20.

To enable a positioning of the read-write head over each of the tracks and the spacing between the centerlines of plungers 36 and 37 equals a multiple of the spacing between adjacent indentations 34 plus one-half such spacing. Consequently, by engaging the positioning rack with one or the other one of the plungers it can be moved in increments of one-half the spacing between the indentations or, in the above described case, in increments of 0.010 inch.

The accurate positioning of carriage 24 and read-write head 22 requires absolute rigidity of plungers 36 once one of them engages an indentation in the positioning rack. Such rigidity precludes the presence of backlash as is encountered when mounting cylindrical shafts in conventional bearings, even when the bearings are machined to the closest tolerances since space between the shaft and the bearing must remain to permit relative movements between the two. For mounting the plungers the present invention provides a base plate 40 which is conventionally secured to a portion of carriage 24, as by using threaded bolts, and which is accurately located with dowel pins or the like. Lateral sides of the base plate mount a pair of elongate pressure plates 42 which are spaced apart by an upwardly extending leaf spring 44 and which are secured to the base plate and frictionally retain the leaf spring in position by means of a threaded bolt 46. A U-shaped clip 48 includes a bore 50 which fits tightly over the exterior of each plunger 36 and 37 and the free ends of the clip embrace the upper end of the spring and are secured thereto with rivets 52 or the like. The clip can be positively and immovably connected to the plunger by conventional means such as brazing, welding or providing setscrews (not shown) on each side of the clip which retain the clip on the plunger.

It can now be seen that the mounting leaf springs 44 for plungers 36 and 37 permit lateral movements of the plungers (as indicated by phantom lines in FIG. 3) but their rigidity prevents any movements of the plungers in the direction of carriage movement. Engagement of an indentation by a plunger, therefore, firmly and immovably locks the carriage in position.

Also mounted to baseplate 40 is a takeup nut 54 provided with a locknut 55 which engages a threaded hole in a lug 56 extending upwardly from baseplate 40 and which retains one end of a compression spring 58. The other end of the spring engages one of the clips 48 to bias plungers 36 into their normal position (shown in solid lines in FIG. 2) away from positioning rack 30.

Referring again to FIGS. 1 and 2, plunger actuating means 38 comprises a pair of special purpose electromagnetic solenoids 60, 62 in which plungers 36, 37 form the solenoid armatures and which permit movements of the plungers along the motion path of carriage 24 while enabling their actuation in opposition to the force exerted by compression spring 58 at any relative position of the plungers over the full extent of the carriage travel.

The first, larger solenoid 60 is defined by a conventional electromagnetic coil 64 which spaces a pair of generally L-shaped temporarily magnetizable armature plates 66 which abut the end faces of the coil and are rigidly secured to a magnet core (not separately shown) in a known manner. Short legs 68 of plate 66 face towards each other and together they define a relatively narrow gap 70 which is slightly wider than the diameter of plungers 36, 37 and which extends parallel to the carriage 24 movement. The length of gap 70, and therewith of armature plates 66 is greater than the maximum travel of the carriage and the armature plates are so positioned that plunger 36 extends through the gap in all possible positions of the carriage.

The armature plates 66 define an interior space 72 which is substantially wider than the width of gap 70 and in which a flat head 74 of plunger 36 is disposed so that movement of the plunger away from solenoid 60 (toward positioning rack 30) is limited by the engagement of plunger head 74 with short legs 68. While the solenoid 60 is deenergized, that is during its normal operative position, compression spring 58 biases the plunger away from positioning rack 30 so that plunger head 74 is disengaged from armature plate legs 68. Upon energization of the electromagnetic coil 64 the armature plates are energized so that a magnetic field pulls plunger head 74 forward until the opposite end of the plunger rests in an indentation 34 of the positioning rack. The energization of the electromagnetic coil causes the actuation of the plunger irrespective of the relative position of the plunger and, therewith, carriage 24.

For actuation of second plunger 37 the second solenoid 62 is provided. It is constructed in the same manner as solenoid 60, that is it comprises an electromagnetic coil 76 to which a pair of L-shaped armature plates 78 are secured in the above-described manner to define a gap 80 between ends of short legs 82 of the plates to permit plunger 37 to extend to an interior space 84 of the second solenoid. Plunger 37 also includes a flat head 86 on which magnetic forces act for movement of the plunger to the right (as viewed in FIG. 2) upon energization of the magnetic coil. The second solenoid partially extends into interior space 72 of the first solenoid and solenoid gaps 70 and 80 are in mutual alignment so that plunger 37 can extend through both gaps as illustrated in FIG. 2. The armature plates of the second solenoid, and gap 80 also extend parallel to the direction of movement of carriage 24 and the gap has the same length as gap 70 so that plunger 37 is at all times disposed within gap 80. To accommodate the insertion of the second solenoid a portion of armature plates 78 is removed to define a sloping side 86 to prevent an interference between the armature plates and electromagnetic coil 64 of the first solenoid and to thereby enable the nesting of the two solenoids as best seen in FIG. 1.

Turning now to the operation of the positioning device 28, and referring to FIGS. 1 through 3, a data disk is placed on the turntable and the disk memory is connected to a computer (not shown). The recordation and/or readout of data bits onto or from disk 16 is performed by recording or retrieving data bits which are randomly distributed over data tracks 20 in accordance with control signals from the computer. The control signals are received by a control circuitry 90 of the disk memory and are used to actuate drive mechanism 26 for positioning read-write head 22 at the desired data track on disk 16. The positioning of carriage 24, and therewith of the read-write head is generally within a few thousandths of an inch, say 0.004 inch, of the alignment of the data track and the read-write head. Final and exact alignment of the two is accomplished by actuating one or the other of the solenoids 60, 62 via signals from control circuitry 90. When one of the plungers 36, 37 engages the corresponding indentation 34 in positioning rack 30 the read-write head is truly aligned with the desired data track for recording or reading the data bit or bits as directed by the computer.

Thereafter, new signals are received from control circuitry 90 to first release the plunger that had previously been actuated and to then reposition the read-write head to its next working position by energizing drive mechanism 26. The exact lineup of the read-write head with the next data track on disk 16 is again performed by actuating one of the plungers 36, 37 in the previously described manner.

Figure 4:
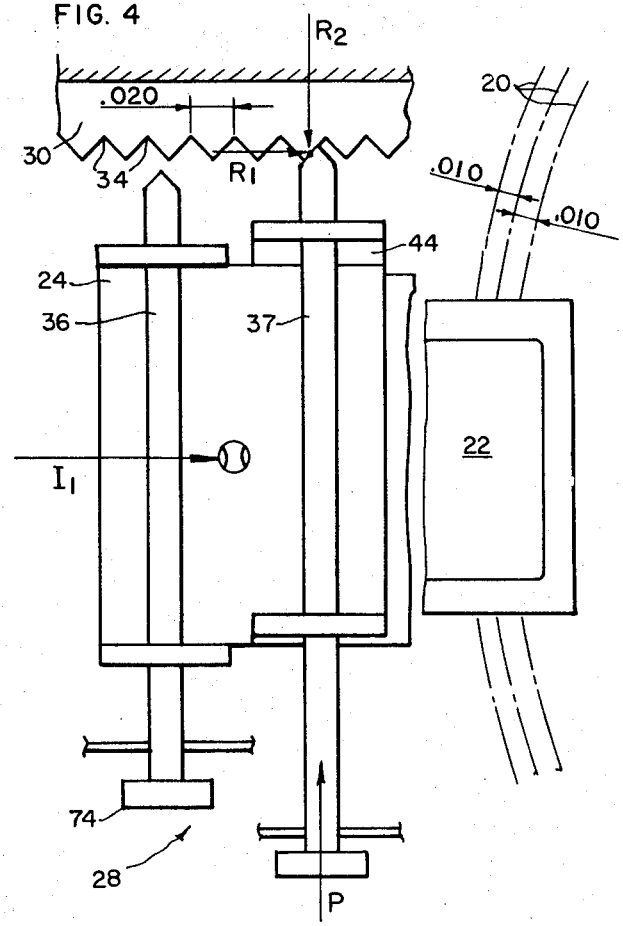
FIG. 4 is a schematic plan view of the positioning device of the present invention and illustrates the flow of forces and the isolation of the read-write head carriage from such forces.
Figure 5:
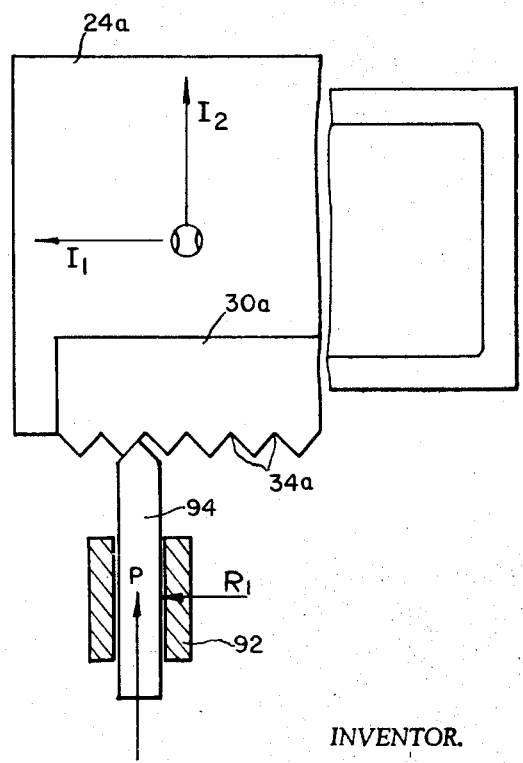
FIG. 5 is a schematic plan view of a prior art positioning device for a read-write head carriage and illustrates the generation of lateral vibration-inducing forces.

Referring to FIGS. 4 and 5, the effectiveness of the present invention in isolating carriage 24 and read-write head 22 from lateral vibrations is illustrated on hand of schematic drawings. FIG. 4 shows a construction in accordance with the present invention while FIG. 5 illustrates a carriage 24a to which a read-write head 22a is mounted and which further mounts a positioning track 30a having a plurality of equally spaced indentations 34a substantially identical to positioning track 30 illustrated in FIGS. 1 and 2. A conventional solenoid 92 is mounted to the base of the support structure (not separately shown in FIG. 5) and includes a plunger or armature 94 which, upon energization of the solenoid, is moved forward until it engages one of the indentations 34a in positioning rack 30a.

When plunger 94 engages positioning rack 30a with a force P carriage 24a is subjected to a force pair $I_1$ and $I_2$ which act on the carriage in perpendicular directions. $I_1$ moves the carriage in its direction of movement until the plunger rests at the bottom of the indentation whereby read-write head 22a is aligned with the corresponding data track on the data disk (not shown in FIG. 5) while force $I_2$ acts in a lateral direction. Since the read-write head and the forward portion of carriage 24a form a cantilever beam, force $I_2$ causes substantial lateral fibrations of the carriage and the read-write head which cause the above mentioned undesirable side effects in the data pickup of the head unless sufficient time is allowed to elapse until the vibrations are dampened.

Referring to FIG. 4 particularly, the forces acting on carriage 24 and read-write head 22 are illustrated. Plunger 37 is mounted to the carriage in the above described manner to permit lateral movements of the plunger and, when it is subjected to a force P upon energization of the solenoid of the present invention, a perpendicular force pair $R_1$ and $R_2$ results at data track 30 which act in the direction of carriage movement and perpendicular thereto, respectively. Force $R_1$ results in a corresponding force $I_1$ on carriage 24 to move the carriage longitudinally until the end of the plunger fully engages the bottom of indentation 34 whereby the read-write head is exactly aligned with the corresponding data track on the data disk (not shown in FIG. 4). Lateral force $R_2$, however, from the impact of plunger 37 on positioning rack 30 and the magnetic force exerted by the solenoid, is directly transmitted to the base (not shown in FIG. 4) of the disk memory support structure without affecting the carriage or the read-write head, that is without the transmission of any lateral forces to the carriage. Consequently, the carriage is not subjected to lateral vibrations and the recordation or pickoff of data can commence immediately after the positioning device of the present invention has accurately positioned the read-write head by engaging plunger 37 in the corresponding indentation 34 of the positioning track. As a result of the backlash free mounting of plunger 37 to carriage 24 any longitudinal vibrations or inaccuracies in the positioning of the read-write head are also eliminated to provide a positive, precision alignment of the read-write head with the data track on the data disk.

While one embodiment of the invention has been shown and described, it will be obvious that other adaptations and modifications can be made without departing from the true spirit and scope of the invention.

I claim:

1. Apparatus for accurately positioning a carriage movable in a first direction without subjecting the carriage to lateral forces acting in a second, perpendicular direction, the apparatus comprising: an indexing member axially movable in the second direction, means for axially movably mounting the member to the carriage, an index rack mounted to a supporting structure of the apparatus for engagement by the member and extending in the first direction, and means for selectively moving the member into engagement with a predetermined portion of the rack to thereby precisely locate the carriage in a predetermined position over its longitudinal travel, the member moving means including an electromagnetic solenoid and means for mounting the solenoid to the support structure.

2. Apparatus according to claim 1 wherein the member defines an armature of the solenoid, and including means permitting relative movement between the solenoid and the member in the first direction.

3. Apparatus according to claim 1 wherein the means for mounting the member to the carriage comprises backlash free, positive guidance means permitting movement of the member in the second direction and maintaining the member rigid and immovable in the first direction, stop means limiting the movement of the member away from the index rack, and means biasing the member against the stop means.

4. Apparatus according to claim 3 including means for adjusting the relative position of the stop means.

5. Apparatus according to claim 3 including means for mounting the stop means to the carriage.

6. Apparatus according to claim 5 wherein the member defines an armature of the solenoid, including means for mounting the member to the carriage, and means permitting relative movement between the member and the solenoid.

7. A positioning device for a disk memory pickup head mounted to an axially movable carriage supported by a base of the disk memory, the apparatus comprising: means extending in the direction of movement of the carriage, mounted to the base and having a plurality of equally spaced indentations arranged to extend in the direction of carriage travel, temporarily excitable electromagnetic means mounted to the base on the side of the carriage opposite the indentation means, plunger means positioned substantially perpendicular to the direction of carriage movement, means for axially movably connecting the plunger means to the carriage so that a first end of the plunger means is engageable with the indentations a second end of the plunger means cooperating with the electromagnetically excitable means for movement of the plunger means in one direction, and means cooperating with the plunger means for movement of the plunger means in another, opposite direction to enable the precise positioning of the carriage by selectively energizing the electromagnetically excitable means when the carriage is at a predetermined position.

8. A device according to claim 7 wherein the electromagnetically excitable means comprises an electromagnet having a core connected to a pair of magnetizable plates disposed at ends of the magnet, the plates having a generally L-shaped configuration and extending towards each other to define a gap extending in the direction of carriage travel, and wherein the plunger means includes a head on the second end thereof, the head being disposed between the plates, whereby the plunger means is constrained to the plates and energization of the electromagnet moves the plunger means into engagement with an indentation.

9. A device according to claim 7 including a plurality of plunger means mounted to the carriage side by side, magnetically excitable means for each plunger means, and means spacing apart the first ends of the plunger means a distance which varies from a multiple of the spacing between adjacent indentations by an amount equal to the spacing between adjacent indentations divided by the number of plunger means, whereby the carriage can be precisely positioned at increments less than the spacing between adjacent indentations.

10. Apparatus for the quick, vibration-free positioning of a read-write head of a disk memory comprising: a base, a read-write head carriage movable radially towards and away from the center of a memory disk rotatably mounted to the base, rack means mounted to the base having a plurality of equally spaced indentations arranged side by side parallel to the carriage movement, means selectively engageable with the indentations, means mounting the engaging means to the carriage and permitting movement of the engaging means towards and away from the rack means, means for rapidly moving the engaging means into engagement with an indentation without subjecting the carriage to substantial lateral forces, and means for mounting the means for moving the engaging means to the base.

11. Apparatus according to claim 10 wherein the means for moving the engaging means comprises spaced-apart magnetizable plates defining a gap extending in the direction of carriage movement through which the engaging means projects, the gap having a greater length than the maximum effective travel of the carriage, and means for selectively magnetizing and demagnetizing the plates for movement of the engaging means towards and away from the rack.

12. An electromagnetic solenoid permitting substantial movements of its armature member in a direction transverse to the direction of armature movement upon energization of the solenoid, the solenoid comprising: a pair of spaced-apart plates defining an interior space, ends of the plates further defining an elongate gap of a transverse width which is less than the width of the interior space to permit the insertion of the armature member into the interior space through the gap, and an electromagnetic actuator disposed in the interior space and having its end faces connected to the plates, whereby energization of the actuator magnetizes the plates and an armature member disposed on the interior space and extending through the gap is moved irrespective of the relative position of the armature member in the gap.

13. Apparatus according to claim 12 including a second solenoid cooperating with the first, the second solenoid comprising an electromagnetic actuator, and a pair of magnetizable plates spaced apart by the actuator, and defining a second interior space having a width greater than the maximum spacing of the first magnetizable plates for placement of the first solenoid in the interior space defined by the second solenoid, the second plates also defining a second gap disposed parallel to the first gap and in alignment with the first gap so that a portion of the first armature member extending past the first solenoid can extend through the second gap, the gap defining portions of the first and second magnetizable plates being sufficiently spaced to permit the insertion and actuation of a second armature member in the space between the gap defining portions of the first and second plates.

* * * * *